United States Patent
Zotov et al.

(10) Patent No.: US 11,959,935 B2
(45) Date of Patent: Apr. 16, 2024

(54) RESONANTLY VIBRATING ACCELEROMETER WITH CROSS-COUPLING SIGNAL SUPPRESSION

(71) Applicant: Emcore Corporation, Alhambra, CA (US)

(72) Inventors: Sergey Alexandrovich Zotov, Concord, CA (US); Arvind K. Srivastava, Brentwood, CA (US)

(73) Assignee: EMCORE CORPORATION, Alhambra, CA (US)

( * ) Notice: Subject to any disclaimer, the term of this patent is extended or adjusted under 35 U.S.C. 154(b) by 0 days.

(21) Appl. No.: 17/832,638

(22) Filed: Jun. 4, 2022

(65) Prior Publication Data
US 2023/0314463 A1 Oct. 5, 2023

Related U.S. Application Data

(60) Provisional application No. 63/326,817, filed on Apr. 2, 2022.

(51) Int. Cl.
*G01P 15/097* (2006.01)
*G01P 15/08* (2006.01)
(Continued)

(52) U.S. Cl.
CPC ........... *G01P 15/097* (2013.01); *G01P 15/09* (2013.01); *G01P 15/18* (2013.01); *G01P 21/00* (2013.01);
(Continued)

(58) Field of Classification Search
CPC .............. G01P 15/097; G01P 15/0802; G01P 2015/0814; G01P 2015/0817; G01P 21/00; G01P 15/09
See application file for complete search history.

(56) References Cited

U.S. PATENT DOCUMENTS 4,258,572 A * 3/1981 Loper, Jr. .............. G01P 15/097
310/329
4,479,385 A * 10/1984 Koehler .................. G01P 15/08
73/DIG. 1

(Continued)

FOREIGN PATENT DOCUMENTS

| CN | 110879302 | 3/2020 |
| CN | 112379128 | 2/2021 |

(Continued)

OTHER PUBLICATIONS

International Search Report and Written Opinion (ISA/KR) dated Jul. 25, 2023 in counterpart/co-owned App No. PCT/US2023/017228 filed Apr. 1, 2023.

(Continued)

*Primary Examiner* — Helen C Kwok
(74) *Attorney, Agent, or Firm* — David S. Alavi

(57) ABSTRACT

An inventive accelerometer includes a proof mass, vibrating sensors, and an excitation-and-detection circuit. The vibrating sensors are substantially identical, and each exhibits corresponding fundamental and higher-order vibrational modes characterized by corresponding fundamental and higher-order resonant mode frequencies. The excitation-and-detection circuit drives each corresponding vibrating sensor at one of its resonant mode frequencies $f_1$ or $f_2$; the vibrational modes driven at the frequencies $f_1$ and $f_2$ are the same for each sensor. Compressive or tensile loads oppositely applied by the proof mass to the vibrating sensors cause a difference frequency $\Delta f = f_1 - f_2$ to vary monotonically with acceleration of the apparatus along the sensing axis. The excitation-and-detection circuit includes at least one low-pass filter with a low-pass cut-off frequency $f_{LP}$ that is less than $\Delta f$.

21 Claims, 7 Drawing Sheets

(51) Int. Cl.
*G01P 15/09* (2006.01)
*G01P 15/18* (2013.01)
*G01P 21/00* (2006.01)

(52) U.S. Cl.
CPC ............... *G01P 2015/0814* (2013.01); *G01P 2015/0817* (2013.01)

(56) References Cited

U.S. PATENT DOCUMENTS

| | | | | |
|---|---|---|---|---|
| 4,535,638 | A * | 8/1985 | EerNisse | G01L 1/106 |
| | | | | 310/338 |
| 4,751,849 | A * | 6/1988 | Paros | G01L 1/162 |
| | | | | 73/778 |
| 4,939,935 | A * | 7/1990 | Amand | G01P 15/097 |
| | | | | 73/DIG. 1 |
| 5,265,473 | A * | 11/1993 | Funabashi | G01P 15/097 |
| | | | | 310/368 |
| 5,315,874 | A * | 5/1994 | Petrovich | G01P 15/0802 |
| | | | | 73/488 |
| 5,379,639 | A | 1/1995 | Hulsing, II et al. | |
| 5,856,722 | A | 1/1999 | Haronian | |
| 5,969,249 | A * | 10/1999 | Roessig | G01P 15/0802 |
| | | | | 73/514.36 |
| 6,230,565 | B1 * | 5/2001 | Foote | G01P 15/097 |
| | | | | 73/497 |
| 6,763,340 | B1 | 7/2004 | Burns | |
| 2004/0255671 | A1 * | 12/2004 | Le Roy | G01P 15/097 |
| | | | | 73/497 |
| 2005/0091843 | A1 * | 5/2005 | Yu | G01P 15/097 |
| | | | | 29/830 |
| 2008/0087083 | A1 | 4/2008 | Nishizawa et al. | |
| 2012/0067124 | A1 * | 3/2012 | Zolfagharkhani | G01P 15/097 |
| | | | | 73/579 |
| 2013/0204571 | A1 * | 8/2013 | Savchenko | G01P 15/097 |
| | | | | 702/141 |
| 2015/0226762 | A1 | 8/2015 | Seshia et al. | |
| 2016/0139171 | A1 * | 5/2016 | Becka | G01P 15/0802 |
| | | | | 216/41 |
| 2016/0377647 | A1 | 12/2016 | Fertig et al. | |
| 2018/0003749 | A1 | 1/2018 | Dogiamis et al. | |
| 2020/0096537 | A1 | 3/2020 | Bramhavar et al. | |
| 2020/0166537 | A1 * | 5/2020 | Zou | G01P 15/0802 |
| 2020/0200792 | A1 | 6/2020 | Bramhavar et al. | |
| 2022/0041433 | A1 | 2/2022 | Alsaleem | |
| 2022/0063989 | A1 | 3/2022 | Sylvestre | |
| 2023/0113659 | A1 | 4/2023 | Hagen | |
| 2023/0314464 | A1 | 10/2023 | Zotov et al. | |
| 2023/0314467 | A1 | 10/2023 | Zotov et al. | |

FOREIGN PATENT DOCUMENTS

| | | |
|---|---|---|
| CN | 113252943 | 8/2021 |
| CN | 113358899 | 9/2021 |
| JP | 2009-042240 | 2/2009 |

OTHER PUBLICATIONS

International Search Report and Written Opinion (ISA/KR) dated Jul. 24, 2023 in co-owned App No. PCT/US2023/017229 filed Apr. 1, 2023.

International Search Report and Written Opinion (ISA/KR) dated Jul. 27, 2023 in co-owned App No. PCT/US2023/017230 filed Apr. 1, 2023.

* cited by examiner

RESONANTLY VIBRATING ACCELEROMETER WITH CROSS-COUPLING SIGNAL SUPPRESSION

BENEFIT CLAIMS TO RELATED APPLICATIONS

This application claims benefit of U.S. provisional App. No. 63/326,817 entitled "Resonantly vibrating accelerometer" filed Apr. 2, 2022 in the names of Sergey Alexandrovich Zotov and Arvind K. Srivastava, said provisional application being hereby incorporated by reference as if set forth herein in its entirety.

FIELD OF THE INVENTION

The field of the present invention relates to accelerometers. In particular, examples of a resonantly vibrating accelerometer and inventive methods for its use are disclosed.

SUMMARY

An inventive accelerometer includes first and second vibrating sensors, a proof mass, and an excitation-and-detection circuit. The vibrating sensors are substantially identical. Each vibrating sensor exhibits a corresponding set of fundamental and higher-order vibrational modes, each characterized by a corresponding fundamental or higher-order resonant mode frequency. The excitation-and-detection circuit (i) drives the first vibrating sensor at a selected resonant mode frequency $f_1$, (ii) drives the second vibrating sensor at a selected resonant mode frequency $f_2$ that corresponds to the selected resonant mode frequency of the first vibrating sensor, and (iii) produces an output signal indicative of a difference frequency $\Delta f = f_1 - f_2$. The output signal is filtered by at least one low-pass filter characterized by a low-pass cut-off frequency $f_{LP}$ that is less than $\Delta f$. The proof mass is connected to the vibrating sensors so that (i) acceleration in one direction along a sensing axis causes the proof mass to apply a tensile load to the first vibrating sensor and a compressive load to the second vibrating sensor, (ii) acceleration in the other direction causes the proof mass to apply a compressive load to the first vibrating sensor and a tensile load to the second vibrating sensor, and (iii) the loads applied by the proof mass to the first and second vibrating sensors cause the difference frequency $\Delta f = f_1 - f_2$ to vary monotonically with acceleration of the apparatus along the sensing axis.

In some examples $f_{LP}$ can be greater than about $1.0 \times 10^2$ Hz; in some examples $f_{LP}$ can be less than about half of $\Delta f$. In some examples the resonant mode frequencies $f_1$ and $f_2$ can correspond to the fundamental vibrational modes of the first and second vibrating sensors, respectively; in some other examples the resonant mode frequencies $f_1$ and $f_2$ can correspond to one of the higher-order vibrational modes (e.g., the third-order mode) of each of the first and second vibrating sensors, respectively.

Objects and advantages pertaining to accelerometers may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
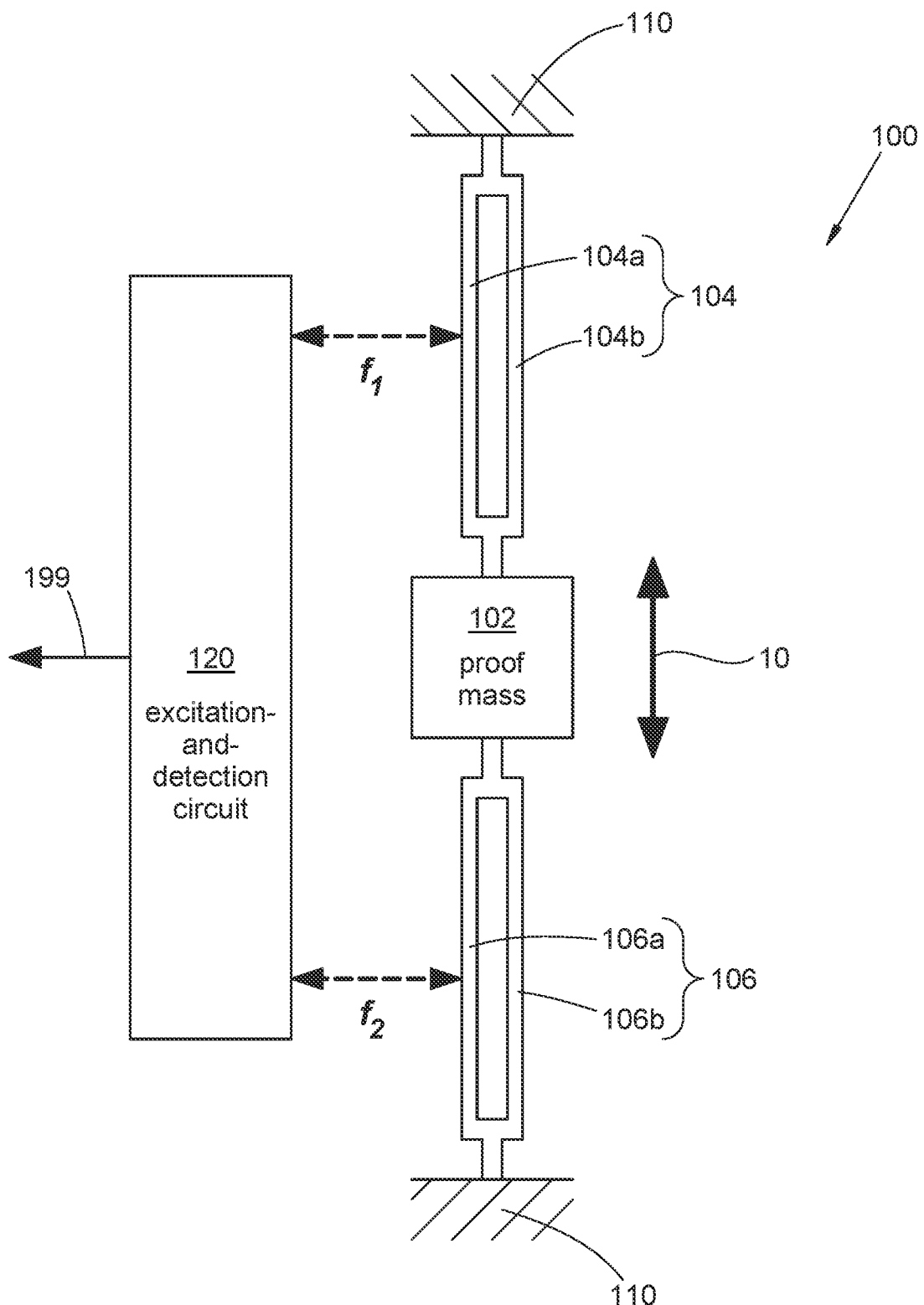
FIG. 1 illustrates schematically an example of a resonantly vibrating accelerometer driven at a single frequency.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims. In the drawings (e.g., in FIGS. 1-3), some schematic illustrations of example structures of various devices and assemblies described herein may be shown with precise right angles and straight lines, but it is to be understood that such schematic illustrations may not reflect real-life process limitations or defects. Such process limitations or defects can cause the features to look not so "ideal" when any of the structures described herein are examined using, e.g., optical or electron microscopy. In such images of real structures, possible processing limitations or defects might be visible, e.g., not-perfectly straight edges of materials, inadvertent rounding of corners or variations in widths or thicknesses of different structural elements. There may be other limitations or defects not listed here that can occur within the field of device fabrication.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the invention. The detailed description illustrates by way of example, not by way of limitation, the principles of the invention.

For purposes of the present disclosure or appended claims, the term "accelerometer" is intended to encompass devices that can respond to or measure linear acceleration along one or more spatial directions. In many instances, including the examples disclosed herein, an accelerometer is sensitive to linear acceleration along a single axis of motion, which is referred to herein as the axis of sensitivity or, equivalently, as the sensing axis. To construct a navigation unit (e.g., an inertial measurement unit or IMU), usually three or more such accelerometers are assembled together (often in combination with one or more gyroscopes that sense or measure rotational motion). Three accelerometers typically are assembled in relative orientations so that their sensing axes collectively span three-dimensional space. A common arrangement includes three accelerometers arranged with mutually orthogonal sensing axes. In the present disclosure examples of a single-axis accelerometer are described and shown; it is to be understood that any disclosed example can be incorporated into, e.g., an IMU along with one or more other accelerometers (of the same type or of one or more different types) or with one or more gyroscopes (of any one or more suitable types).

A schematic diagram of a resonantly vibrating accelerometer 100 is shown in FIG. 1. The accelerometer 100 comprises a proof mass 102 and a pair of substantially identical first and second vibrating beam sensors 104 and 106, respectively. In the examples shown in the drawings, the sensors 104 and 106 are vibrating dual-beam sensors, i.e., the first sensor 104 comprises two substantially parallel spaced-apart beams 104a and 104b joined together at or near both ends thereof, and the second sensor 106 comprises two substantially parallel spaced-apart beams 106a and 106b joined together at or near both ends thereof. Other suitable arrangements of the beam sensors 104 and 106 can be employed. The sensors 104 and 106 are each attached at one end thereof to the proof mass 102, and are each attached at the other end thereof to a housing, frame, or other structural member 110 of the accelerometer 100. The sensors 104 and 106 typically are arranged substantially collinearly and substantially parallel to the sensing axis 10.

The first vibrating sensor 104 exhibits a corresponding fundamental vibrational mode and a set of higher-order vibrational modes corresponding to that fundamental vibrational mode; similarly, the second vibrating sensor 106 exhibits a corresponding fundamental vibrational mode and a set of higher-order vibrational modes corresponding to that fundamental vibrational mode. Note that a fundamental vibrational mode can also be referred to as a first-order mode. Each fundamental and higher-order vibrational mode of each of the vibrating sensors 104 and 106 is characterized by a corresponding fundamental or higher-order resonant mode frequency. The description of the sensors 104 and 106 as being "substantially identical" means that they are each of the same nominal size, shape, and arrangement, and made of the same one or more materials. However, they can differ sufficiently so that their corresponding fundamental and higher-order resonant mode frequencies might differ by relatively small frequency offsets, e.g., roughly 1 part in 30, 50, 100, 200, 500, or more. In some examples, it might be difficult to fabricate the vibrating sensors 104 and 106 to exhibit the same resonant mode frequencies, and subsequent "trimming" can be employed to match the respective resonant mode frequencies to one another. In some examples, during fabrication of the vibrating sensors 104 and 106 they might be made identically and then subsequently trimmed so as to slightly detune, intentionally, their respective resonant mode frequencies from one another.

Figure 7A:
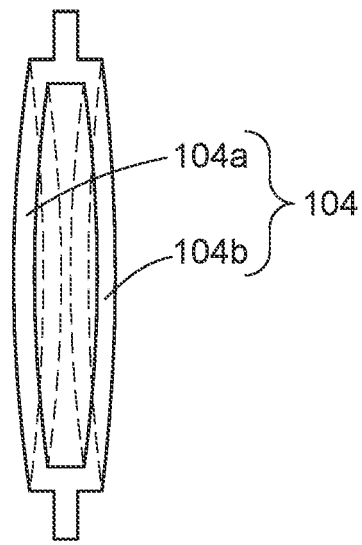
FIGS. 7A and 7B illustrate schematically fundamental and third-order symmetric transverse vibrational modes, respectively, of a vibrating dual-beam sensor.
Figure 7B:
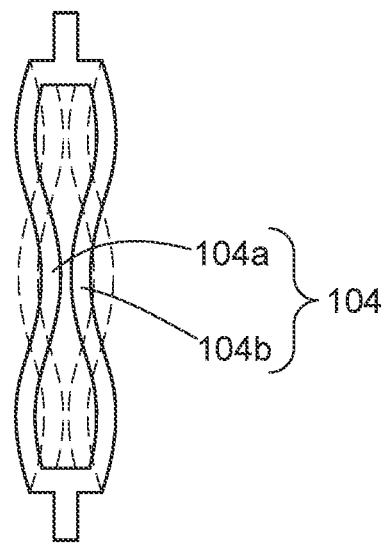

Any suitable set of fundamental and higher-order vibrational modes can be used in the disclosed apparatus and methods. In some examples each vibrating sensor 104 and 106 comprises one or more elongated beams and, for each vibrating sensor 104 and 106, the corresponding fundamental vibrational mode and set of higher-order vibrational modes can be transverse vibrational modes of the one or more elongated beams. In some other examples, for each vibrating sensor 104 and 106, the corresponding fundamental vibrational mode and set of higher-order vibrational modes can be longitudinal vibrational modes. In some examples (including those shown in the drawings), each vibrating sensor 104 and 106 comprises a pair of elongated beams (i.e., dual beams 104a/104b for sensor 104, and dual beams 106a/106b for sensor 106). For each such dual-beam vibrating sensor, the corresponding fundamental vibrational mode and set of higher-order vibrational modes can be symmetric transverse vibrational modes of the pair of elongated beams; fundamental and third-order symmetric transverse vibrational modes of a dual-beam vibrating sensor 104 are illustrated schematically in FIGS. 7A and 7B, respectively (the transverse movement of the beams may be exaggerated in the drawings for illustrative purposes).

The proof mass 102 is connected to the first and second vibrating sensors 104 and 106 so that acceleration of the apparatus 100 along the sensing axis 10 causes the proof mass 102 to apply tensile or compressive loads to the sensors 104 and 106. In this context "applying a tensile load" is defined relative to any tensile or compressive load that might already be applied to the sensor in question, e.g., applying tension to a sensor under neither tension nor compression, increasing tension on a sensor already under tension, or decreasing compression on a sensor already under compression (perhaps enough to put that sensor under tension). Likewise, "applying a compressive load" is defined relative to any tensile or compressive load that might already be applied to the sensor in question, e.g., applying compression to a sensor under neither tension nor compression, increasing compression on a sensor already under compression, or decreasing tension on a sensor under tension (perhaps enough to put that sensor under compression). Such "baseline" tension or compression of the sensors 104 and 106 can arise from, e.g., thermal expansion mismatch among different materials of the accelerometer, off-axis acceleration, gravity, manufacturing tolerances, and so forth. In some instances there might be no baseline tension or compression, or only negligible baseline tension or compression, of the sensors 104 and 106 in the absence of acceleration of the apparatus 100 along the sensing axis 10.

In some examples the proof mass 102 and the vibrating sensors 104 and 106 can be integrally formed from a single continuous volume of material, e.g., crystalline quartz or suitable piezoelectric material, or crystalline silicon or other suitable non-piezoelectric material. In some of those examples the housing, frame, or other support structure 110 can also be integrally formed along with the proof mass 102 and sensors 104 and 106. In some examples such integral formation of the proof mass 102 and sensors 104 and 106 (and support structure 110, if that is the case) can reduce or eliminate baseline tension or compression of the sensors 104 and 106 described above. For example, thermal expansion mismatch can be eliminated if all structures are the same material. Integral formation of those elements (e.g., by machining or etching a single continuous volume of a single material, or a single continuous volume of multiple adhered layers of one or more materials) can also eliminate baseline tension or compression that might arise from size tolerances if they were fabricated separately and then assembled together. However, in some examples the proof mass 102, sensors 104/106, or the support structure 110 can be discrete parts that are assembled together.

Crystalline quartz is piezoelectric, and so can be advantageously employed to enable the sensors 104 and 106 to be driven to vibrate with electrical drive signals (e.g., applied via suitably positioned and connected drive electrodes or contacts) and in turn generate electrical signals indicative of their respective vibratory motions (e.g., detected via suitably positioned and connected sensing electrodes or contacts). In examples wherein a non-piezoelectric material is employed, a suitable drive mechanism (e.g., an electrostatic drive) and detection mechanism (e.g., a capacitance-based readout structure) can be employed.

Acceleration of the apparatus 100 in one direction (i.e., in a first direction) along the sensing axis 10 causes the proof mass 102 to apply a tensile load to the first vibrating sensor 104 and a compressive load to the second vibrating sensor 106. Acceleration of the apparatus 100 in the other direction (i.e., in a second direction opposite the first direction) along the sensing axis 10 causes the proof mass 102 to apply a compressive load to the first vibrating sensor 104 and a tensile load to the second vibrating sensor 106. The resonant mode frequencies of each of the sensors 104 and 106 vary monotonically, and over certain ranges linearly or nearly linearly, with tensile or compressive load applied to each sensor 104/106 by the proof mass 102, and so also vary monotonically (and over certain ranges linearly or nearly linearly) with acceleration of the apparatus 100 along the sensing axis 10 (e.g., as in FIGS. 4A and 4B, in which linear variation is schematically depicted). It is that sensitivity of the resonant mode frequencies of the sensors 104/106 that enables the apparatus 100 to function as an accelerometer. The arrangement of the sensors 104 and 106 with the proof mass 102 between them results in their respective resonant frequencies shifting in opposite directions with acceleration along the sensing axis 10.

Figure 2:
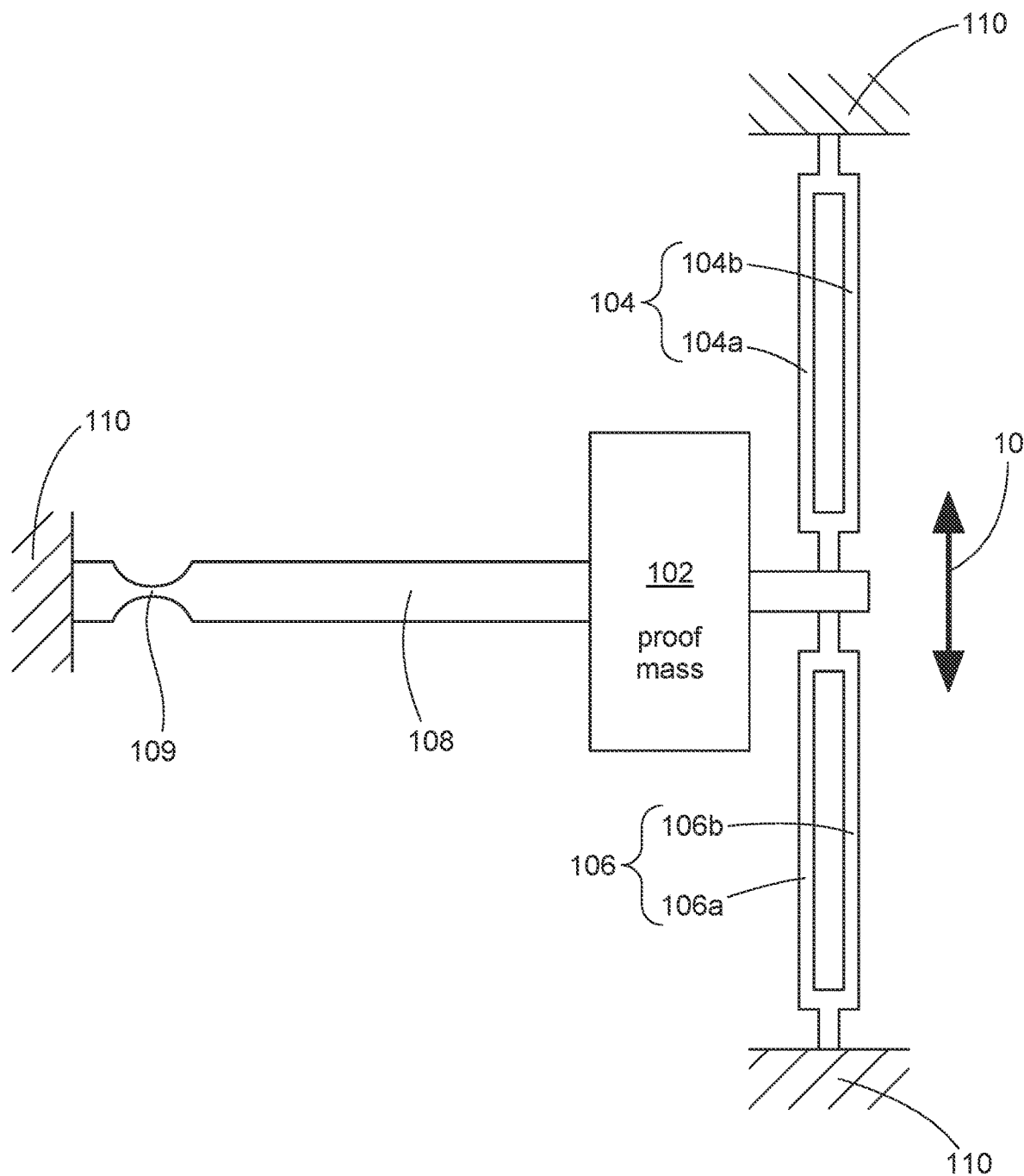
FIG. 2 illustrates schematically an example arrangement of a resonantly vibrating accelerometer.

A specific example of an arrangement of the proof mass 102 and the sensors 104 and 106 is illustrated schematically in FIG. 2. In that example, the proof mass 102 is connected to the support structure 110 (e.g., a housing or frame) by an elongated linking member 108. The linking member can include a hinge region 109 so that the linking member 108 and the proof mass 102 form a pendulum movable in a plane defined by the linking member 108 and the sensing axis 10 (i.e., in the plane of FIG. 2; referred to hereafter as the pendular plane). That pendular movement permits the proof mass 102 to load the sensors 104 and 106 in response to acceleration along the sensing axis 10. At the same time the linking member 108 reduces or prevents movement of the proof mass in the pendular plane perpendicular to the sensing axis 10, and can be made sufficiently thick (in a direction perpendicular to the pendular plane) to constrain the pendular movement to the pendular plane. By thus constraining the movement of the proof mass 102, any loading of the sensors 104 and 106 by accelerations perpendicular to the sensing axis 10 (so-called cross-axis accelerations) can be reduced or eliminated. In some examples the linking member 108 can be integrally formed from a single continuous volume of a single material (or from a single continuous volume of multiple adhered layers of one or more materials) along with the proof mass 102, sensors 104/106, and support structure 110.

An excitation-and-detection circuit 120 of any suitable type structured and connected to (i) drive the first vibrating sensor 104 at frequency $f_1$ selected from among its resonant mode frequencies, and (ii) drive the second vibrating sensor 106 at frequency $f_2$ selected from among its resonant mode frequencies, and that corresponds to the selected resonant mode frequency of the first vibrating sensor 104 (e.g., if $f_1$ is the frequency of the fundamental symmetric transverse vibrational mode of the sensor 104, then $f_2$ would be the frequency of the fundamental symmetric transverse vibrational mode of the sensor 106). The excitation-and-control circuit 120 produces an output signal 199 indicative of a difference frequency $\Delta f = f_1 - f_2$. The signal 199 can be "indicative" of the difference frequency $\Delta f$ in any suitable way, e.g., a digital or numerical value produced by a frequency counter or a difference between two frequency counters, a voltage proportional to $\Delta f$ (in some examples produced by a comparator), an oscillatory signal that oscillates at $\Delta f$ (in some examples produced by a mixer), and so on. Other output signals from the excitation-and-detection circuit 120 can be similarly indicative of, e.g., one or more of $f_1$, $f_2$, or linear or nonlinear functions of $f_1$ and $f_2$.

Figure 4A:
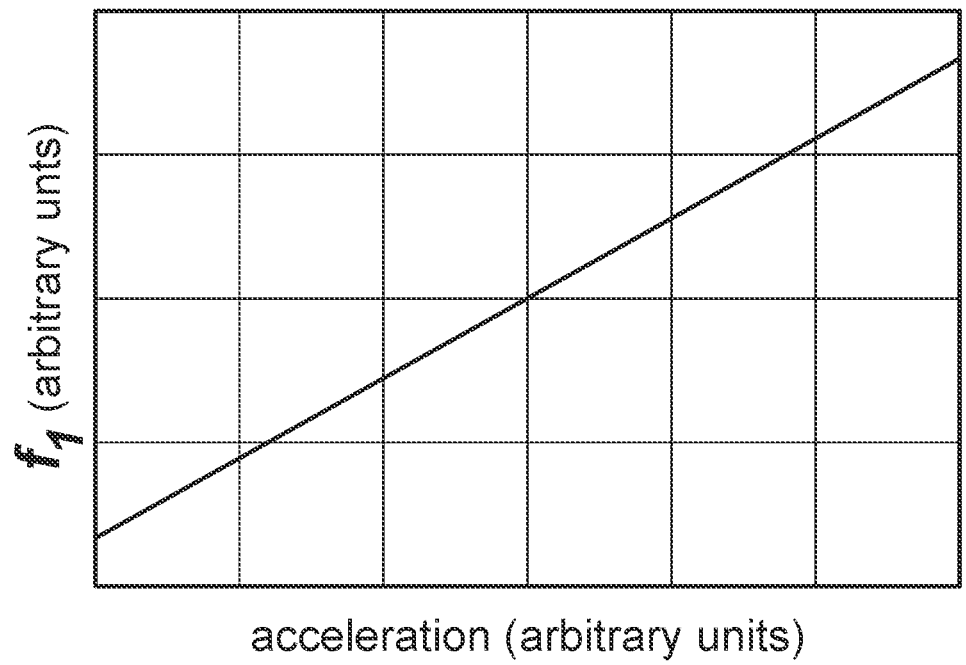
FIGS. 4A and 4B are example plots of the dependence on acceleration of resonant vibrating frequencies of vibrating sensors arranged as in FIG. 1, 2, or 3.
Figure 4B:
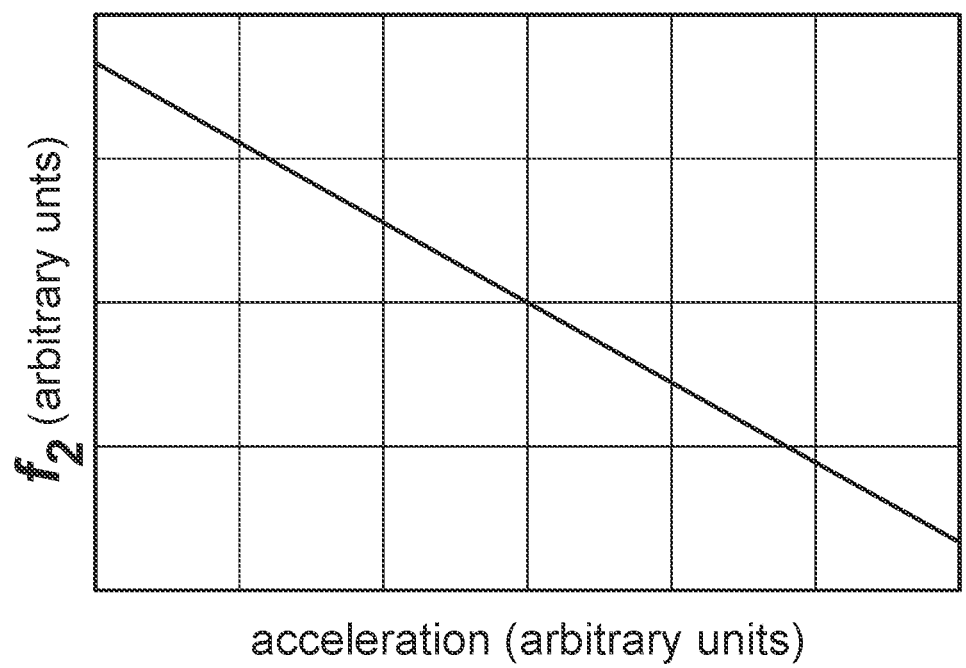

The sensors 104 and 106 are substantially identical, and so exhibit the same set of vibrational modes (albeit usually with their corresponding resonant mode frequencies slightly offset from one another, as described above). The resonant mode frequencies $f_1$ and $f_2$ are chosen so that the same vibrational mode is driven in each of the sensors 104 and 106. As a result, the resonant mode frequencies are relatively close together, e.g., within one or a few parts in 30, 50, 100, 200, 500, or so. It may be desirable in some instances to select resonant mode frequencies $f_1$ and $f_2$ that are more than one hundred Hz apart or more than a few hundred Hz apart, as discussed further below. The arrangement of the sensors 104 and 106 and the proof mass 102 between them result in a difference frequency $\Delta f = f_1 - f_2$ that varies monotonically with acceleration of the apparatus 100 along the sensing axis 10. In some examples, over a selected operational range of acceleration along the sensing axis 10, the sensors 104 and 106 and the proof mass 102 can be arranged so that the difference frequency $\Delta f = f_1 - f_2$ varies substantially linearly with acceleration of the apparatus 100 along the sensing axis 10. An example of linear dependence of the resonant frequencies $f_1$ and $f_2$ on acceleration (resulting in linear dependence of the difference frequency $\Delta f$ on acceleration) is shown in FIGS. 4A and 4B.

Figure 3:
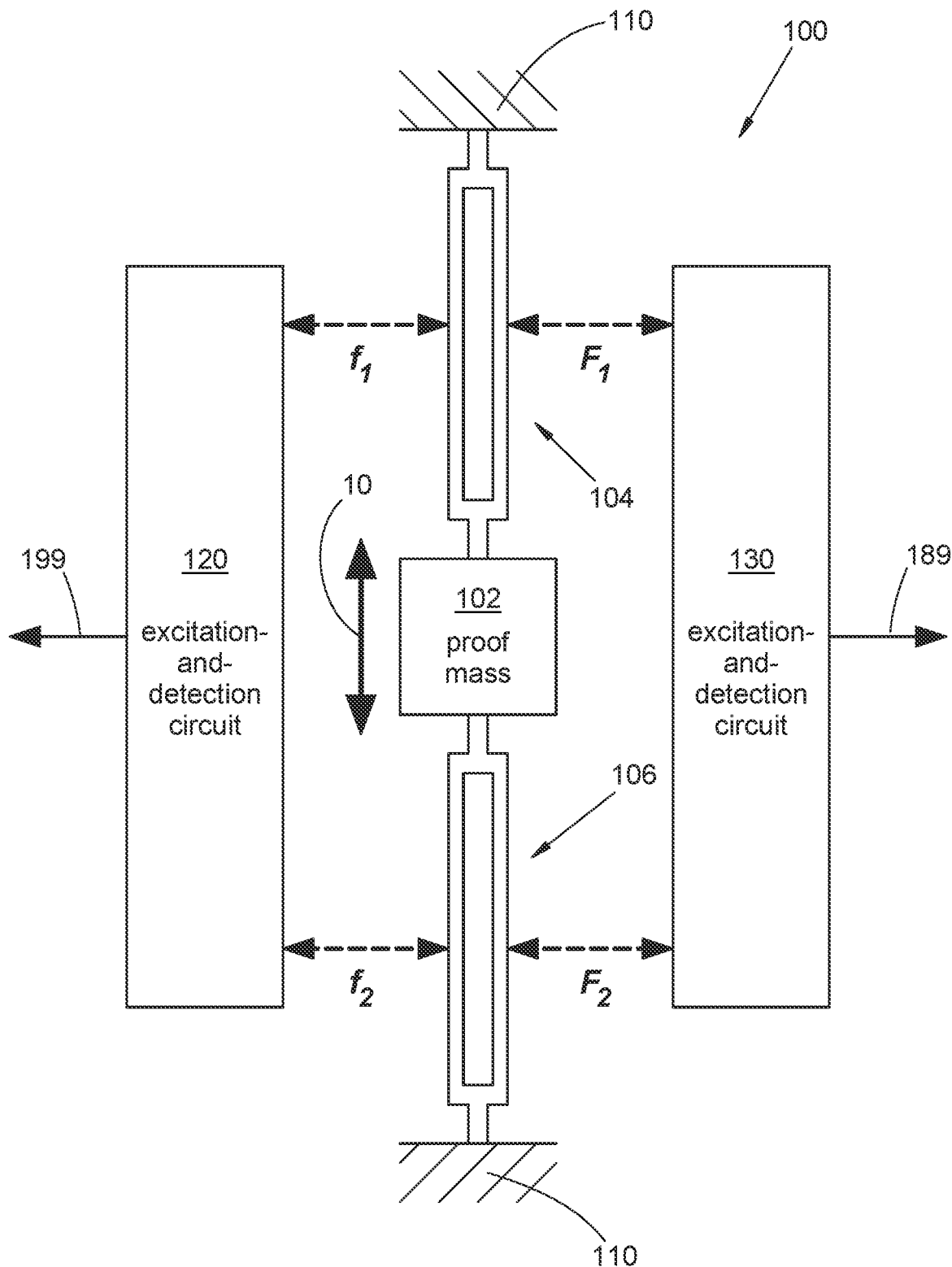
FIG. 3 illustrates schematically an example of a resonantly vibrating accelerometer driven at two frequencies.

The sensing-and-detection circuit 120 can be structured and connected to drive the sensors 104 and 106 in any suitable way (represented by dashed double-headed arrows in FIGS. 1 and 3). In some examples each vibrating sensor 104 or 106 can form a self-sustained oscillator when coupled to the excitation-and-detection circuit 120. In some examples, each of the vibrating sensor 104 or 106 can be coupled to the excitation-and-detection circuit 120 in a corresponding phase-locked-loop arrangement. Any suitable type or arrangement of the excitation-and detection circuit 120 can be employed (e.g., phase-locked loop couplers, self-resonant couplers, parametric resonant couplers, and so forth), implemented using any suitable analog circuity, digital circuitry, general or application-specific integrated circuits, microprocessors, or combinations thereof.

A processing module (e.g., comprising analog circuitry, digital circuitry, one or more computer processor(s), computer memory or storage media, or combinations thereof) can be structured, connected, or programmed to receive one or more output signals from the excitation-and-detection circuit 120 and in turn generate a measurement of the acceleration of the apparatus 100 along the sensing axis 10. In some examples a signal indicative of the resonant mode frequency $f_1$ and a signal indicative of the resonant mode frequency $f_2$ can be combined to yield signal 199 that is indicative of the difference frequency $\Delta f = f_1 - f_2$; in some examples the excitation-and-detection circuit can produce a linear or nonlinear function of the resonant mode frequencies $f_1$ and $f_2$. In some examples, the measurement of the acceleration can be based at least in part on $\Delta f$. The signal 199 can be further processed in any suitable way, using other portions of the processing module (not shown), to generate the measurement of the acceleration. Other suitable arrangements of the processing module, and other suitable ways for generating a measurement of the acceleration based on the difference frequency $\Delta f$, or other linear or nonlinear function of the resonant mode frequencies $f_1$ and $f_2$, can be employed, e.g., using frequency counters to determine the frequencies $f_1$ and $f_2$, or the difference frequency $\Delta f$, or other function of the frequencies $f_1$ and $f_2$, and then digitally processing those frequencies to measure the acceleration.

In some examples, the excitation-and-detection circuit 120 can be structured and connected so that the output signal 199 is filtered by at least one low-pass filter characterized by a low-pass cut-off frequency $f_{LP}$. Such a low-pass filter can reduce noise in the signal 199 (e.g., detected at the difference frequency $\Delta f$) that is used to measure the acceleration. However, that signal 199 typically includes a cross-coupling spectral feature, at a frequency offset equal to $\Delta f$, that can interfere with the acceleration measurement. In previous accelerometers, the cross-coupling spectral feature at the frequency offset of $\Delta f$ was obscured in the overall noise of the system and did not require particular attention. If a low-pass filter were to be employed in such previous accelerometers, $f_{LP}$ could have been chosen without any particular regard for the cross-coupling spectral feature. However, as systems have improved recently (e.g., with the introduction of phase-locked loops), the overall noise floor has dropped, revealing the cross-coupling spectral feature at $\Delta f$. For that reason, the sensors 104 and 106 can be arranged to exhibit resonant mode frequencies that are offset from one another at zero acceleration, and the low-pass filters can be employed and can be arranged so that $f_{LP} < \Delta f$ to reduce or eliminate influence on the acceleration measurement of the cross-coupling spectral feature described above. In some examples the low-pass filter can be arranged so that (i) $2 \cdot f_{LP} < \Delta f$. In some examples, the low-pass filters can be arranged so that $f_{LP}$ is greater than about $1.0 \times 10^2$ Hz, greater than $2.0 \times 10^2$ Hz, greater than $3.0 \times 10^2$ Hz, greater than $5 \times 10^2$ Hz, greater than $1.0 \times 10^3$ Hz, greater than $2.0 \times 10^3$ Hz, greater than $3.0 \times 10^3$ Hz, greater than $5 \times 10^3$ Hz, or greater than $1.0 \times 10^4$ Hz. A lower cut-off frequency $f_{LP}$ can reduce noise on the signal 199 (e.g., at the difference frequency $\Delta f$), yielding a more accurate measurement of the acceleration. However, a lower cut-off frequency $f_{LP}$ also can slow the response time of the accelerometer (i.e., restrict the bandwidth of the accelerometer), potentially reducing its accuracy for measuring rapidly varying acceleration. In some examples cut-off frequency $f_{LP}$ can be selected that yields a suitable balance, based on any one or more suitable or desirable criteria or figures-of-merit (FOMs), between noise reduction and measurement speed or bandwidth.

Figure 5A:
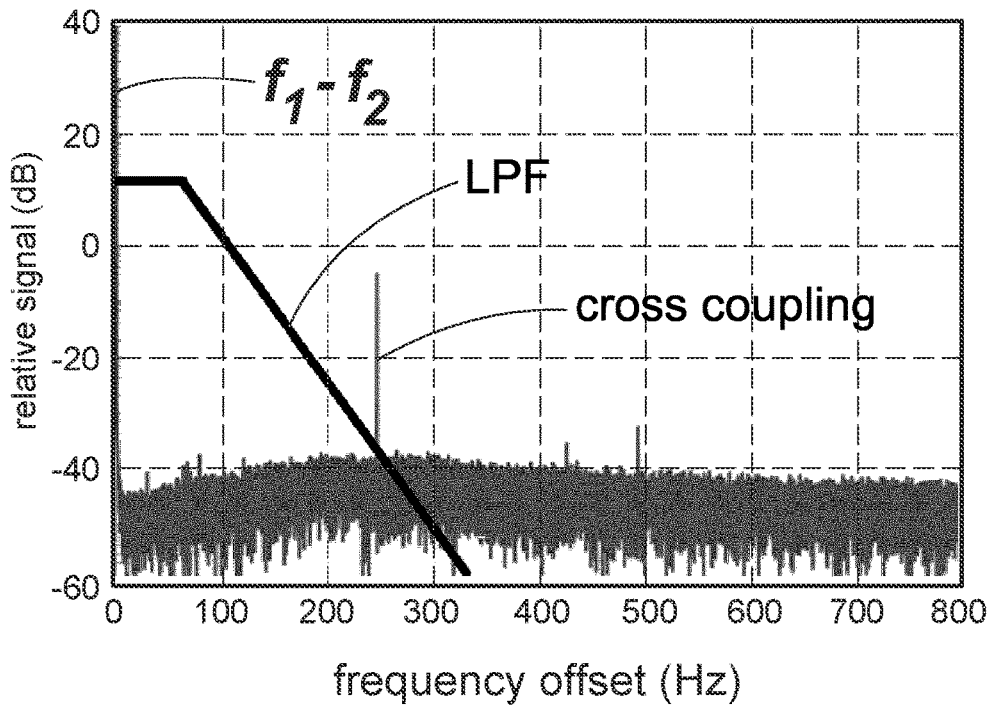
FIGS. 5A and 5B are example plots of frequency noise as a function of frequency offset for an example resonantly vibrating accelerometer driven at the fundamental vibrational frequency (FIG. 5A) or at the third-order vibrational frequency (FIG. 5B).
Figure 5B:
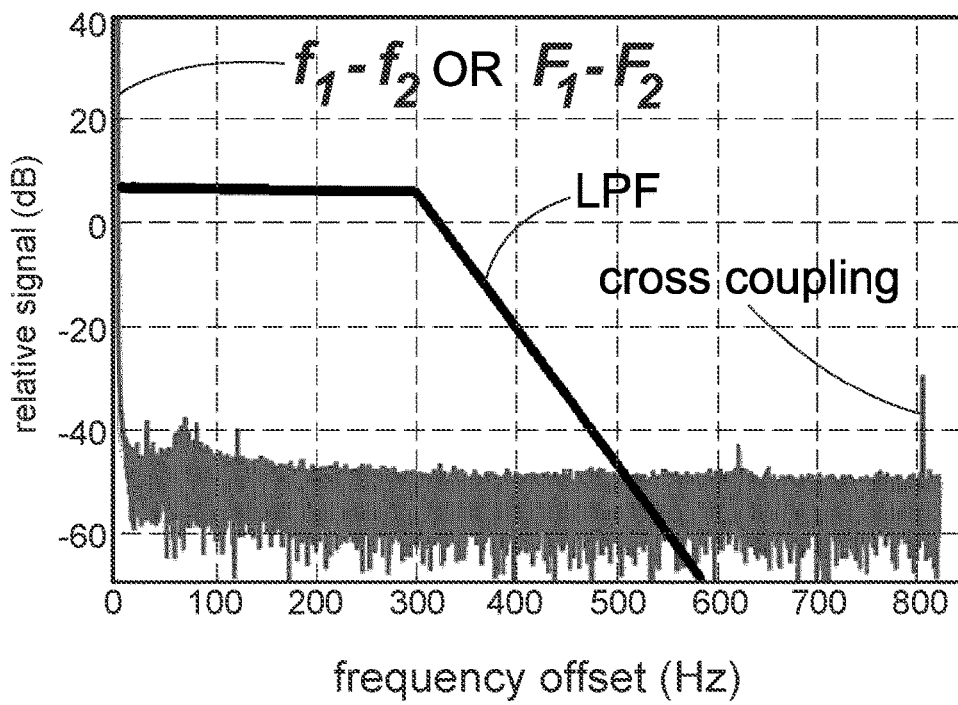

In some examples the sensors 104 and 106 can be arranged to exhibit one or more resonant mode frequencies so that $\Delta f$ is sufficiently large, relative to a necessary, suitable, or desired cut-off frequency $f_{LP}$. In some examples those resonant mode frequencies $f_1$ and $f_2$ can correspond to the fundamental vibrational modes of the first and second vibrating sensors 104 and 106, respectively. In such examples the sensors 104 and 106 can be fabricated or trimmed to exhibit a sufficiently large difference frequency $\Delta f$ for their respective fundamental modes. In some examples, instead of engineering (or reengineering) the sensors 104 and 106 to exhibit a sufficiently large difference frequency $\Delta f$ between their fundamental modes, the selected resonant mode frequencies $f_1$ and $f_2$ can correspond to one of the higher-order vibrational modes of each of the sensors 104 and 106. In some examples, the resonant mode frequencies $f_1$ and $f_2$ can correspond to the third-order vibrational modes of the sensors 104 and 106. Whatever the difference between the resonant frequencies of the fundamental modes, the difference between successive higher-order mode frequencies tends to increase. Even if a given pair of sensors 104 and 106 exhibit a difference frequency between their fundamental modes that is too small, simply driving those sensors 104 and 106 at a higher-order mode (e.g., the third-order mode) can yield a difference frequency $\Delta f$ that is sufficiently large relative to a desired value for $f_{LP}$. The plot of FIG. 5A shows results from an example wherein the sensors 104 and 106 are driven in their fundamental vibrational modes at about 17 kHz and exhibit a difference frequency $\Delta f$ of about 240 Hz; a low-pass filter with cut-off frequency $f_{LP}$ of about 10 Hz is employed to filter out the undesirable cross-coupling spectral feature at 240 Hz. The plot of FIG. 5B shows results from an example wherein the sensors 104 and 106 are driven in their third-order vibrational modes at about 110 kHz and exhibit a difference frequency $\Delta f$ of about 810 Hz; a low-pass filter with cut-off frequency $f_{LP}$ of about 200 Hz is employed to filter out the undesirable cross-coupling spectral feature at 810 Hz.

In some examples (e.g., as in FIG. 3), in addition to the excitation-and-detection circuit 120 driving the sensors 104/106 at frequencies $f_1$ and $f_2$ to generate a signal 199 (e.g., oscillating at the difference frequency $\Delta f$), the apparatus 100 can include an additional excitation-and-detection circuit 130 coupled to drive the sensors 104 and 106 as described above. In some examples the excitation-and-detection circuits 120 and 130 can be of the same general type or arrangement; in some other examples they can be of different types or arrangements. The excitation-and-detection circuit 130 can (i) drive the sensor 104 at an additional selected resonant mode frequency $F_1$ of the sensor 104 that differs from $f_1$, and (ii) drive the sensor 106 at an additional selected resonant mode frequency $F_2$ of the sensor 106 that differs from $f_2$, and that corresponds to the additional selected resonant mode frequency of the first vibrating sensor 104 (e.g., if $F_1$ is the frequency of the third-order symmetric transverse vibrational mode of the sensor 104, then $F_2$ would be the frequency of the third-order symmetric transverse vibrational mode of the sensor 106). With two modes driven simultaneously, the overall vibration of the sensor 104 is a superposition of the vibrational mode at resonant mode frequency $f_1$ and the vibrational mode at resonant mode frequency $F_1$; similarly, with two modes driven simultaneously, the overall vibration of the sensor 106 is a superposition of the vibrational mode at resonant mode frequency $f_2$ and the vibrational mode at resonant mode frequency $F_2$. The excitation-and-detection circuit 130 produces an output signal 189 indicative of a difference frequency $\Delta F = F_1 - F_2$. As with the difference frequency $\Delta f$, the difference frequency $\Delta F = F_1 - F_2$ varies monotonically with acceleration of the apparatus 100 along the sensing axis 10. Other output signals from the excitation-and-detection circuit 130 can be similarly indicative of, e.g., one or more of $F_1$, $F_2$, or linear or nonlinear functions of $F_1$ and $F_2$. In some examples, over a selected operational range of acceleration along the sensing axis 10, the sensors 104 and 106 and the proof mass 102 can be arranged so that the difference frequency $\Delta F = F_1 - F_2$ varies substantially linearly with acceleration of the apparatus 100 along the sensing axis 10. The behavior of the resonant mode frequencies $F_1$ and $F_2$ resembles that of $f_1$ and $f_2$ shown in FIGS. 4A and 4B.

Any two resonant modes of the sensors 104/106 can be chosen to be driven by the excitation-and-detection circuits 120/130. In some examples, the resonant mode frequencies $f_1$ and $f_2$ correspond to the fundamental vibrational modes of the sensors 104 and 106, respectively, while the resonant mode frequencies $F_1$ and $F_2$ correspond to one of the higher-order vibrational modes of the sensors 104 and 106, respectively. In some examples, the resonant mode frequencies $F_1$ and $F_2$ correspond to the third-order vibrational modes of the sensors 104 and 106, respectively. In some examples, more than two resonant modes of each sensor 104/106 can be driven simultaneously by corresponding excitation-and-detection circuits; in one specific example, each sensor 104/106 can be driven simultaneously at its fundamental, third-order, and fifth-order vibrational modes.

In some examples generally arranged as shown in FIG. 3, $f_1 < F_1$, $f_2 < F_2$, and $\Delta f < \Delta F$. A low-pass filter can be incorporated into the excitation-and-detection circuit 130 and can be characterized by a low-pass the cut-off frequency $f_{LP}$, with $f_{LP} < \Delta F$ (for the reasons discussed above). In some of those examples, (i) $2 \cdot f_{LP} < \Delta F$, (ii) $\Delta f < f_{LP} < \Delta F$, or (iii) $f_{LP} < \Delta f < 2 \cdot f_{LP} < \Delta F$. In some examples generally arranged as in FIG. 3, $f_{LP}$ can be greater than about $1.0 \times 10^2$ Hz, greater than $2.0 \times 10^2$ Hz, greater than $3.0 \times 10^2$ Hz, greater than $5 \times 10^2$ Hz, greater than $1.0 \times 10^3$ Hz, greater than $2.0 \times 10^3$ Hz, greater than $3.0 \times 10^3$ Hz, greater than $5 \times 10^3$ Hz, or greater than $1.0 \times 10^4$ Hz. The processing module can be structured, connected, or programmed so as to receive one or more output signals from the second excitation-and-control circuit 130 and to generate a measurement of the acceleration of the apparatus 100 along the sensing axis 10, based at least in part on $\Delta F$, $\Delta f$, or other linear or nonlinear function of one or more or all of the frequencies $f_1$, $f_2$, $F_1$, or $F_2$.

The apparatus 100 is intended to measure acceleration along the sensing axis 10, through the effect of the forces exerted by the proof mass 102 on the sensors 104 and 106 along the sensing axis 10. The sensors 104 and 106 are arranged collinearly with the proof mass 102 between them, so that acceleration along the sensing axis 10 loads them in opposite directions, i.e., tensile loading on one sensor and compressive loading on the other. The opposite loading of the sensors 104 and 106 results in their resonant mode frequencies shifting in opposite directions, so that $\Delta f$ (if arranged as in FIG. 1), or $\Delta f$ and $\Delta F$ (if arranged as in FIG. 3), vary monotonically with acceleration along the sensing axis 10. That arrangement also enables common-mode rejection of other, undesired effects or perturbations that load the sensors 104 and 106 in the same direction, or that shift the resonant mode frequencies in the same direction. Examples of such undesired effects or perturbations can include (i) changing temperature, pressure, humidity, or other environmental condition, (ii) the presence of cross-axis acceleration, or (iii) aging of the apparatus resulting in altered material properties or behaviors of components.

Figure 6A:
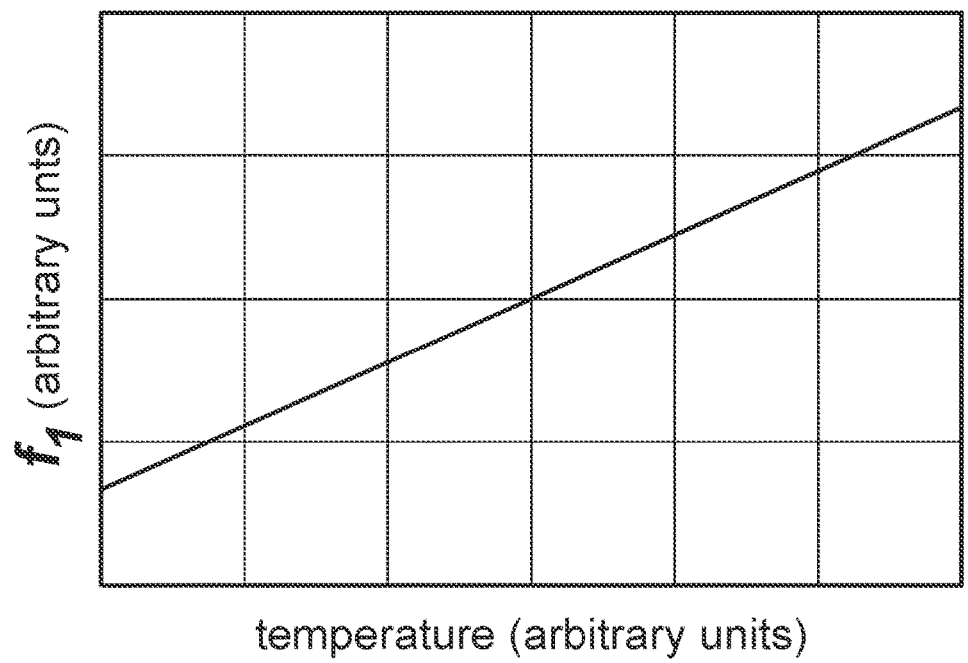
FIGS. 6A and 6B are example plots of the dependence on temperature of resonant vibrating frequencies of vibrating sensors arranged as in FIG. 1, 2, or 3.
Figure 6B:
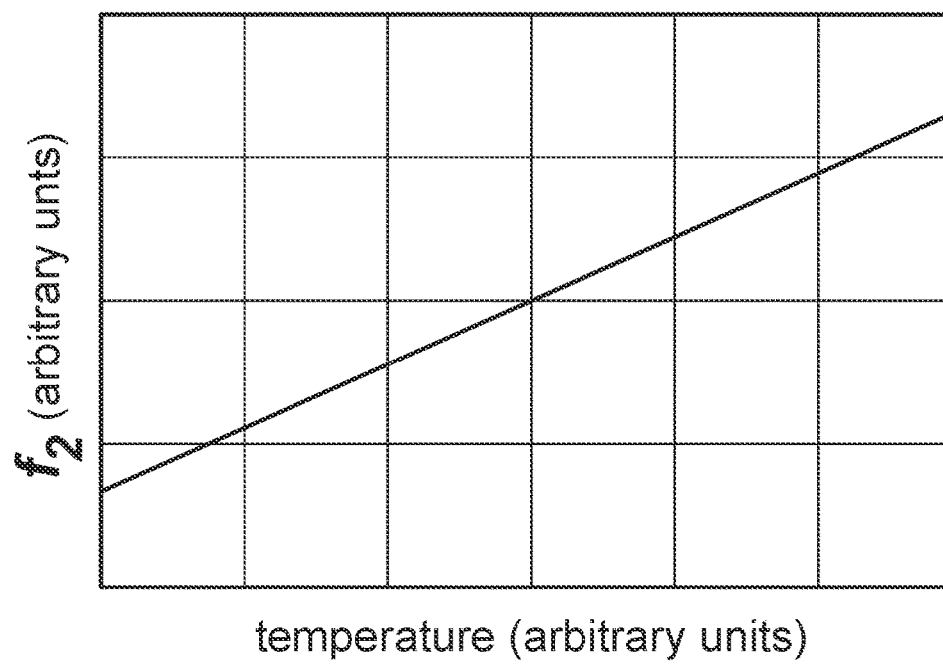

As shown in FIGS. 6A and 6B, the resonant mode frequencies $f_1$, $f_2$, $F_1$, and $F_2$ vary in the same direction with changing temperature, so that measurement of acceleration using, e.g., $\Delta f$ or $\Delta F$ to measure acceleration is relatively less sensitive to changing temperature than any single one of the individual resonant mode frequencies. Similarly, cross-axis acceleration perpendicular to the sensing axis 10 can cause the proof mass 102 to exert forces on the sensors 104 and 106 and alter their resonant mode frequencies. Cross-axis acceleration, however, loads both sensors 104 and 106 in the same way and shifts their respective resonant mode frequencies in the same direction. Again, using $\Delta f$ or $\Delta F$ to measure acceleration is relatively less sensitive to cross-axis acceleration than any single one of the resonant mode frequencies.

However, it is possible that changing temperature might alter the slopes of the curves of FIG. 4A differently from one another, altering a scale factor employed when measuring the acceleration. Other perturbations (e.g., cross-axis acceleration) might similarly produce undesirable alterations of a scale factor. Accordingly, in some examples the processing module can be further structured, connected, or programmed so as to compensate or self-calibrate, in the measurement of the acceleration, for one or more potential perturbations of the apparatus 100. Such perturbations can include, but are not necessarily limited to, any one or more (i) variations of temperature of the apparatus, (ii) variations of atmospheric pressure or humidity around the apparatus, (iii) vector components of acceleration of the apparatus perpendicular to the sensing axis (i.e., cross-axis acceleration), or (iv) aging of the apparatus. As noted above, the pendular arrangement of FIG. 2 can in some instances reduce or eliminate effects of cross-axis acceleration.

In some examples arranged as in FIG. 1, the compensation or self-calibration can be based at least in part on one or more of $f_1$, $f_2$, or a linear or nonlinear function of $f_1$ and $f_2$ (e.g., $f_1 + f_2$). In some examples arranged as in FIG. 3, the compensation or self-calibration can be based at least in part on one or more of $f_1$, $f_2$, $F_1$, $F_2$, or one or more linear or nonlinear functions of one or more of $f_1$, $f_2$, $F_1$, or $F_2$ (e.g., $f_1 + f_2$ or $F_1 + F_2$). In some examples arranged as in FIG. 3, the measurement of the acceleration along the sensing axis can be based at least in part on $\Delta f$ or a linear or nonlinear function of $f_1$ and $f_2$, and the compensation or self-calibration can be based at least in part on one or more of $F_1$, $F_2$, or a linear or nonlinear function of $F_1$ and $F_2$. In some other examples arranged as in FIG. 3, the measurement of the acceleration along the sensing axis can be based on at least in part on $\Delta F$ or a linear or nonlinear function of $F_1$ and $F_2$, and the compensation or self-calibration can be based at least in part on one or more of $f_1$, $f_2$, or a linear or nonlinear function of $f_1$ and $f_2$.

In some examples, temperature compensation can be achieved using a first temperature sensor to measure temperature of the integrally formed sensors 104/106 and proof mass 102, and using a second temperature sensor located on, e.g., an electronics board of the processing module to compensate for temperature drift of the accelerometer output. In some examples, sum frequencies $f_1 + f_2$ or $F_1 + F_2$, any other suitable linear or non-linear function of resonant mode frequencies, or any suitable linear or nonlinear function of one or more amplitudes of the corresponding resonant signals from the sensors 104/106, can be employed to estimate the temperature. Each resonant mode frequency and excitation amplitude is sensitive to temperature, and so can be used to estimate temperature of the corresponding sensor 104/106.

In some examples compensation or self-calibration can be achieved using a function of resonant mode frequencies and/or their corresponding amplitudes (in some instances including additional information from one or more temperature sensors) to compensate temperature drift of the accelerometer (e.g., drift of accelerometer bias or scale factor (i.e., slope)), or misalignment drift due to changing temperature or other environmental variable, drift due to aging of the apparatus, or cross-axis acceleration.

In various examples inputs for compensation or self-calibration can include one or more among, e.g., measured amplitudes and/or frequencies of one or more vibrating modes of each vibrating sensor 104/106, measurement signals or data from one or more temperature sensors, measurement signals or data from other types of environmental sensors, or measurement signals or data from one or more other accelerometers arranged to measure cross-axis acceleration. In some examples inputs can include only current (i.e., contemporaneous) measured values; in some examples inputs can include past measured values (e.g., to account for hysteresis-type effects). In some examples, deterministic circuitry or programming can be employed for implementing compensation or self-calibration based on received inputs (using, e.g., calculation or interpolation using measured or modeled calibration curves, look-up tables, and so forth). In some examples, one or more statistical approaches (e.g., a regression model) or machine learning (e.g., a neural network or other artificial intelligence algorithm), or hybrids or combinations of statistical and machine learning approaches, can be employed for implementing compensation or self-calibration. If employed, a machine learning algorithm can be trained using any suitable training protocol (e.g., deep learning, shallow learning, genetic algorithms, fuzzy logic, and so forth), using any suitable set of one or more inputs (including those discussed above). In one specific example the vibrating sensors 104/106 can be driven and their respective fundamental, third-order, and fifth-order modes, and the resulting resonant mode frequencies and amplitudes, along with temperature sensor data (if available) can be used as inputs (first for training, and later for compensation or self-calibration after the algorithm is sufficiently trained). The training can result in the algorithm controlling the accelerometer so that it is relatively immune to environmental changes (e.g., exhibits stable bias, scale factor, or alignments).

In addition to the preceding, the following example embodiments fall within the scope of the present disclosure or appended claims, as are methods described above for using each example embodiment:

Example 1. An apparatus comprising: (a) substantially identical first and second vibrating sensors, each vibrating sensor exhibiting a corresponding fundamental vibrational mode and a set of higher-order vibrational modes corresponding to that fundamental vibrational mode, each fundamental and higher-order vibrational mode of each vibrating sensor being characterized by a corresponding fundamental or higher-order resonant mode frequency; (b) an excitation-and-detection circuit structured and connected so as to (i) drive the first vibrating sensor at a selected resonant mode frequency $f_1$ thereof, (ii) drive the second vibrating sensor at a selected resonant mode frequency $f_2$ thereof that corresponds to the selected resonant mode frequency of the first vibrating sensor, and (iii) produce an output signal indicative of a difference frequency $\Delta f = f_1 - f_2$; and (c) a proof mass connected to the first and second vibrating sensors so that (i) acceleration of the apparatus in a first direction along a sensing axis causes the proof mass to apply a tensile load to the first vibrating sensor and a compressive load to the second vibrating sensor, (ii) acceleration of the apparatus in a second direction along the sensing axis, opposite the first direction, causes the proof mass to apply a compressive load to the first vibrating sensor and a tensile load to the second vibrating sensor, and (iii) the loads applied by the proof mass to the first and second vibrating sensors cause a difference frequency $\Delta f = f_1 - f_2$ to vary monotonically with acceleration of the apparatus along the sensing axis.

Example 2. The apparatus of Example 1 wherein each vibrating sensor comprises one or more elongated beams and, for each vibrating sensor, the corresponding fundamental vibrational mode and set of higher-order vibrational modes are transverse vibrational modes of the one or more elongated beams.

Example 3. The apparatus of Example 1 wherein each vibrating sensor comprises a pair of elongated beams and, for each vibrating sensor, the corresponding fundamental vibrational mode and set of higher-order vibrational modes are symmetric transverse vibrational modes of the pair of elongated beams.

Example 4. The apparatus of Example 1 wherein each vibrating sensor comprises one or more elongated beams and, for each vibrating sensor, the corresponding fundamental vibrational mode and set of higher-order vibrational modes are longitudinal vibrational modes.

Example 5. The apparatus of any one of Examples 1 through 4 wherein, over an operational range of acceleration along the sensing axis, the difference frequency $\Delta f = f_1 - f_2$ varies substantially linearly with acceleration of the apparatus along the sensing axis.

Example 6. The apparatus of any one of Examples 1 through 5 wherein, at zero acceleration along the sensing axis, the difference frequency $\Delta f = f_1 - f_2$ is non-zero.

Example 7. The apparatus of any one of Examples 1 through 6 wherein, over an operational range of acceleration along the sensing axis, the difference frequency $\Delta f = f_1 - f_2$ does not change sign.

Example 8. The apparatus of any one of Examples 1 through 7 wherein the first vibrating sensor is coupled to the excitation-and-detection circuit in a corresponding phase-locked-loop arrangement, and the second vibrating sensor is coupled to the excitation-and-detection circuit in a corresponding phase-locked-loop arrangement.

Example 9. The apparatus of any one of Example 1 through 8 further comprising a processing module that is structured, connected, or programmed so as to receive one or more output signals from the excitation-and-detection circuit and to generate therefrom a measurement, based at least in part on $\Delta f$, or a linear or nonlinear function of $f_1$ and $f_2$, of the acceleration of the apparatus along the sensing axis.

Example 10. The apparatus of Example 9, the processing module being structured, connected, or programmed so as to generate a measurement, based at least in part on $\Delta f$, of the acceleration of the apparatus along the sensing axis.

Example 11. The apparatus of any one of Example 9 or 10, the processing module being further structured, connected, or programmed so as to compensate or self-calibrate, in the measurement of the acceleration, for (i) variations of temperature of the apparatus, (ii) variations of pressure or humidity around the apparatus, (iii) vector components of acceleration of the apparatus perpendicular to the sensing axis, or (iv) aging of the apparatus.

Example 12. The apparatus of Example 11, the processing module being programmed and trained, for compensation or self-calibration, using one or more statistical algorithms, machine learning algorithms, or hybrids or combinations thereof.

Example 13. The apparatus of any one of Examples 11 or 12, the compensation or self-calibration being based at least in part on one or more of $f_1$, $f_2$, or a linear or nonlinear function of one or both of $f_1$ or $f_2$.

Example 14. The apparatus of any one of Examples 11 through 13, the compensation or self-calibration being based at least in part on $f_1 + f_2$.

Example 15. The apparatus of any one of Examples 1 through 14 wherein the excitation-and-detection circuit is structured and connected so that the output signal is filtered by at least one low-pass filter characterized by a low-pass cut-off frequency $f_{LP}$ that is less than $\Delta f$.

Example 16. The apparatus of Example 15 wherein $f_{LP}$ is greater than about $1.0 \times 10^2$ Hz, greater than $2.0 \times 10^2$ Hz, greater than $3.0 \times 10^2$ Hz, greater than $5 \times 10^2$ Hz, greater than $1.0 \times 10^3$ Hz, greater than $2.0 \times 10^3$ Hz, greater than $3.0 \times 10^3$ Hz, greater than $5 \times 10^3$ Hz, or greater than $1.0 \times 10^4$ Hz.

Example 17. The apparatus of any one of Examples 15 or 16 wherein $2 \cdot f_{LP} < \Delta f$.

Example 18. The apparatus of any one of Examples 1 through 17 wherein the resonant mode frequencies $f_1$ and $f_2$ correspond to the fundamental vibrational modes of the first and second vibrating sensors, respectively.

Example 19. The apparatus of any one of Examples 1 through 17 wherein the resonant mode frequencies $f_1$ and $f_2$ correspond to one of the higher-order vibrational modes of the first and second vibrating sensors, respectively.

Example 20. The apparatus of Example 19 wherein the resonant mode frequencies $f_1$ and $f_2$ correspond to the third-order vibrational modes of the first and second vibrating sensors, respectively.

Example 21. The apparatus of any one of Examples 1 through 20 further comprising a second excitation-and-detection circuit structured and connected so as to (i) drive the first vibrating sensor at an additional selected resonant mode frequency $F_1$ thereof, with $F_1 \neq f_1$, (ii) drive the second vibrating sensor at an additional selected resonant mode frequency $F_2$ thereof that corresponds to the additional selected resonant mode frequency of the first vibrating sensor, with $F_2 \neq f_2$, and (iii) produce a second output signal indicative of a difference frequency $\Delta F = F_1 - F_2$, the loads applied by the proof mass to the first and second vibrating sensors causing the difference frequency $\Delta F = F_1 - F_2$ to vary monotonically with acceleration of the apparatus along the sensing axis.

Example 22. The apparatus of Example 21 wherein, over an operational range of accelerations along the sensing axis, the difference frequency $\Delta F = F_1 - F_2$ varies substantially linearly with acceleration of the apparatus along the sensing axis.

Example 23. The apparatus of any one of Examples 21 or 22 wherein, at zero acceleration along the sensing axis, the difference frequency $\Delta F = F_1 - F_2$ is non-zero.

Example 24. The apparatus of any one of Examples 21 through 23 wherein, over an operational range of acceleration along the sensing axis, the difference frequency $\Delta F = F_1 - F_2$ does not change sign.

Example 25. The apparatus of any one of Examples 21 through 24 wherein: (i) the resonant mode frequencies $f_1$ and $f_2$ correspond to the fundamental vibrational modes of the first and second vibrating sensors, respectively; and (ii) the resonant mode frequencies $F_1$ and $F_2$ correspond to one of the higher-order transverse vibrational modes of the first and second vibrating sensors, respectively.

Example 26. The apparatus of any one of Examples 21 through 25 wherein the resonant mode frequencies $F_1$ and $F_2$ correspond to the third-order transverse vibrational modes of the first and second vibrating sensors, respectively.

Example 27. The apparatus of any one of Examples 21 through 26 wherein the first vibrating sensor is coupled to the second excitation-and-detection circuit in a corresponding phase-locked-loop arrangement, and the second vibrating sensor is coupled to the second excitation-and-detection circuit in a corresponding phase-locked-loop arrangement.

Example 28. The apparatus of any one of Examples 21 through 27 wherein (i) the second excitation-and-detection circuit is structured and connected so that the second output signal is filtered by at least one low-pass filter characterized by a low-pass cut-off frequency $f_{LP}$, and (ii) $f_1 < F_1$, $f_2 < F_2$, and $\Delta f < \Delta F$.

Example 29. The apparatus of Example 28 wherein (i) $f_{LP} < \Delta F$, or (ii) $2 \cdot f_{LP} < \Delta F$.

Example 30. The apparatus of any one of Examples 28 or 29 wherein $\Delta f < f_{LP} < \Delta F$.

Example 31. The apparatus of Example 28 wherein $f_{LP} < \Delta f < 2 \cdot f_{LP} < \Delta F$.

Example 32. The apparatus of any one of Example 28 through 31 wherein $f_{LP}$ is greater than about $1.0 \times 10^2$ Hz, greater than $2.0 \times 10^2$ Hz, greater than $3.0 \times 10^2$ Hz, greater than $5 \times 10^2$ Hz, greater than $1.0 \times 10^3$ Hz, greater than $2.0 \times 10^3$ Hz, greater than $3.0 \times 10^3$ Hz, greater than $5 \times 10^3$ Hz, or greater than $1.0 \times 10^4$ Hz.

Example 33. The apparatus of any one of Example 21 through 32 further comprising a processing module that is structured, connected, or programmed so as to receive one or more output signals from the second excitation-and-control circuit and to generate therefrom a measurement, based at least in part on $\Delta F$, or a linear or nonlinear function of $F_1$ and $F_2$, of the acceleration of the apparatus along the sensing axis.

Example 34. The apparatus of Example 33, the processing module being structured, connected, or programmed so as to generate a measurement, based at least in part on $\Delta F$, of the acceleration of the apparatus along the sensing axis.

Example 35. The apparatus of any one of Examples 21 through 32 further comprising a processing module that is structured, connected, or programmed so as to receive one or more output signals from one or both of the first or second excitation-and-detection circuits and to generate therefrom a measurement, based at least in part on one or more of $\Delta f$, $\Delta F$, or a linear or nonlinear function of one or more or all of $f_1$, $f_2$, $F_1$, or $F_2$, of the acceleration of the apparatus along the sensing axis.

Example 36. The apparatus of Example 35, the processing module being structured, connected, or programmed so as to generate a measurement, based at least in part on one or both of $\Delta f$ or $\Delta F$, of the acceleration of the apparatus along the sensing axis.

Example 37. The apparatus of any one of Examples 33 through 36, the processing module being further structured, connected, or programmed so as to compensate or self-calibrate, in the measurement of the acceleration, for (i) variations of temperature of the apparatus, (ii) variations of pressure or humidity around the apparatus, (iii) vector components of acceleration of the apparatus perpendicular to the sensing axis, or (iv) aging of the apparatus.

Example 38. The apparatus of Example 37, the processing module being programmed and trained, for compensation or self-calibration, using one or more statistical algorithms, machine learning algorithms, or hybrids or combinations thereof.

Example 39. The apparatus of any one of Examples 37 or 38, the compensation or self-calibration being based at least in part on one or more of $f_1$, $f_2$, $F_1$, $F_2$, or a linear or nonlinear function of one or more or all of $f_1$, $f_2$, $F_1$, or $F_2$.

Example 40. The apparatus of any one of Examples 37 through 39, the compensation or self-calibration being based at least in part on one or both of $f_1 + f_2$ or $F_1 + F_2$.

Example 41. The apparatus of any one of Examples 37 through 39, the measurement of the acceleration along the sensing axis being based at least in part on $\Delta f$ or a linear or nonlinear function of $f_1$ and $f_2$, and the compensation or self-calibration being based at least in part on one or more of $F_1$, $F_2$, or a linear or nonlinear function of one or both of $F_1$ or $F_2$.

Example 42. The apparatus of any one of Examples 37 through 39, the measurement of the acceleration along the sensing axis being based on at least in part on ΔF or a linear or nonlinear function of $F_1$ and $F_2$, and the compensation or self-calibration being based at least in part on one or more of $f_1$, $f_2$, or a linear or nonlinear function of one or both of $f_1$ or $f_2$.

Example 43. The apparatus of any one of Examples 1 through 42, the proof mass and the vibrating sensors being integrally formed from a single continuous volume of a single material or from a single continuous volume of multiple adhered layers of one or more materials.

Example 44. The apparatus of any one of Examples 1 through 43 wherein the proof mass and the vibrating sensors include crystalline quartz or one or more other piezoelectric materials.

Example 45. The apparatus of any one of Examples 1 through 43 wherein the proof mass and the vibrating sensors include crystalline silicon or one or more other non-piezoelectric materials.

Example 46. The apparatus of any one of Examples 1 through 45, the first and second sensors being arranged substantially collinearly and substantially parallel to the sensing axis.

Example 47. The apparatus of any one of Examples 1 through 46 further comprising an elongated linking member connected to the proof mass so that the linking member and the proof mass are arranged as a pendulum constrained to move in a plane defined by the linking member and the sensing axis.

Example 48. The apparatus of Example 47, the linking member, the proof mass, and the first and second vibrating sensors being formed from a single continuous volume of a single material or from a single continuous volume of multiple adhered layers of one or more materials.

Example 49. The apparatus of any one of Examples 9 through 48, the processing module being further structured, connected, or programmed so as to compensate or self-calibrate, in the measurement of the acceleration, for (i) variations of temperature of the apparatus, (ii) variations of pressure or humidity around the apparatus, (iii) vector components of acceleration of the apparatus perpendicular to the sensing axis, or (iv) aging of the apparatus.

Example 50. The apparatus of Example 49, the processing module being programmed and trained, for compensation or self-calibration, using one or more statistical algorithms, machine learning algorithms, or hybrids or combinations thereof.

Example 51. The apparatus of any one of Examples 49 or 50, the processing module being connected to receive as one or more inputs (i) one or more of resonant mode frequencies of one or both of the first or second vibrating sensors, (ii) one or more vibrational amplitudes of one or both of the first or second vibrating sensors, (iii) measurement signals or data from one or more temperature sensors, (iv) measurement signals or data from one or more other environmental sensors, or (v) measurement signals or data from one or more other accelerometers arranged to measure cross-axis acceleration.

In addition to the preceding, each of the appended claims is incorporated into the description as an additional example embodiment, as are methods described above for using each additional example embodiment.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. In another example, each of "a dog, a cat, or a mouse," "one or more of a dog, a cat, or a mouse," and "one or more dogs, cats, or mice" would be interpreted as (i) one or more dogs without any cats or mice, (ii) one or more cats without any dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. In another example, each of "two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without any dogs, or (iv) one or more dogs, one or more cats, and one or more mice; "three or more," "four or more," and so on would be analogously interpreted.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising:
   (a) substantially identical first and second vibrating sensors, each vibrating sensor exhibiting a corresponding fundamental vibrational mode and a set of higher-order vibrational modes corresponding to that fundamental vibrational mode, each fundamental and higher-order vibrational mode of each vibrating sensor being characterized by a corresponding fundamental or higher-order resonant mode frequency;
   (b) an excitation-and-detection circuit structured and connected so as to (i) drive the first vibrating sensor at a selected resonant mode frequency $f_1$ thereof, (ii) drive the second vibrating sensor at a selected resonant mode frequency $f_2$ thereof that corresponds to the selected resonant mode frequency of the first vibrating sensor, and (iii) produce an output signal indicative of a difference frequency $\Delta f = f_1 - f_2$ and filtered by at least one low-pass filter characterized by a low-pass cut-off frequency $f_{LP}$ that is less than the difference frequency $\Delta f$; and
   (c) a proof mass connected to the first and second vibrating sensors so that (i) acceleration of the apparatus in a first direction along a sensing axis causes the proof mass to apply a tensile load to the first vibrating sensor and a compressive load to the second vibrating sensor, (ii) acceleration of the apparatus in a second direction along the sensing axis, opposite the first direction, causes the proof mass to apply a compressive load to the first vibrating sensor and a tensile load to the second vibrating sensor, and (iii) the corresponding tensile or compressive loads applied by the proof mass to the first and second vibrating sensors cause the difference frequency $\Delta f = f_1 - f_2$ to vary monotonically with acceleration of the apparatus along the sensing axis.

2. The apparatus of claim 1 wherein the low-pass cut-off frequency $f_{LP}$ is greater than about $1.0 \times 10^2$ Hz.

3. The apparatus of claim 1 wherein $2 = f_{LP} < \Delta f$.

4. The apparatus of claim 1 wherein the resonant mode frequencies $f_1$ and $f_2$ correspond to the fundamental vibrational modes of the first and second vibrating sensors, respectively.

5. The apparatus of claim 1 wherein the resonant mode frequencies $f_1$ and $f_2$ correspond to one of the higher-order vibrational modes of the first and second vibrating sensors, respectively.

6. The apparatus of claim 5 wherein the resonant mode frequencies $f_1$ and $f_2$ correspond to respective third-order vibrational modes of the first and second vibrating sensors.

7. The apparatus of claim 1 further comprising a processing module that is structured, connected, or programmed so as to receive one or more output signals from the excitation-and-detection circuit and to generate therefrom a measurement, based at least in part on $\Delta f$, or a linear or nonlinear function of $f_1$ and $f_2$, of the acceleration of the apparatus along the sensing axis.

8. The apparatus of claim 7, the processing module being further structured, connected, or programmed so as to compensate or self-calibrate, in the measurement of the acceleration, for (i) variations of temperature of the apparatus, (ii) variations of pressure or humidity around the apparatus, (iii) vector components of acceleration of the apparatus perpendicular to the sensing axis, or (iv) aging of the apparatus.

9. The apparatus of claim 8, the processing module being programmed and trained, for compensation or self-calibration, using one or more statistical algorithms, machine learning algorithms, or hybrids or combinations thereof.

10. The apparatus of any one of claim 8, the compensation or self-calibration being based at least in part on one or more of $f_1$, $f_2$, or a linear or nonlinear function of one or both of $f_1$ or $f_2$.

11. The apparatus of claim 1 wherein each vibrating sensor comprises a pair of elongated beams and, for each vibrating sensor, the corresponding fundamental vibrational mode and set of higher-order vibrational modes are symmetric transverse vibrational modes of the pair of elongated beams.

12. The apparatus of claim 1 wherein, over an operational range of acceleration along the sensing axis, the difference frequency $\Delta f=f_1-f_2$ varies substantially linearly with acceleration of the apparatus along the sensing axis.

13. The apparatus of claim 1 wherein, at zero acceleration along the sensing axis, the difference frequency $\Delta f=f_1-f_2$ is non-zero.

14. The apparatus of claim 1 wherein, over an operational range of acceleration along the sensing axis, the difference frequency $\Delta f=f_1-f_2$ does not change sign.

15. The apparatus of claim 1 wherein the first vibrating sensor is coupled to the excitation-and-detection circuit in a corresponding phase-locked-loop arrangement, and the second vibrating sensor is coupled to the excitation-and-detection circuit in a corresponding phase-locked-loop arrangement.

16. The apparatus of claim 1, the proof mass and the first and second vibrating sensors being integrally formed from a single continuous volume of a single material or from a single continuous volume of multiple adhered layers of one or more materials.

17. The apparatus of claim 1 wherein the proof mass and the first and second vibrating sensors include crystalline quartz or one or more other piezoelectric materials.

18. The apparatus of claim 1 wherein the proof mass and the first and second vibrating sensors include crystalline silicon or one or more other non-piezoelectric materials.

19. The apparatus of claim 1, the first and second vibrating sensors being arranged substantially collinearly and substantially parallel to the sensing axis.

20. The apparatus of claim 1 further comprising an elongated linking member connected to the proof mass so that the linking member and the proof mass are arranged as a pendulum constrained to move in a plane defined by the linking member and the sensing axis.

21. The apparatus of claim 20, the linking member, the proof mass, and the first and second vibrating sensors being formed from a single continuous volume of a single material or from a single continuous volume of multiple adhered layers of one or more materials.

* * * * *